(12) United States Patent
Grant

(10) Patent No.: US 7,435,092 B2
(45) Date of Patent: Oct. 14, 2008

(54) RETAINER HARNESS CLIP APPARATUS

(75) Inventor: Curley Grant, Holly, MI (US)

(73) Assignee: Valeo Switches and Detection Systems, Auburn Hills, MI (US)

( * ) Notice: Subject to any disclaimer, the term of this patent is extended or adjusted under 35 U.S.C. 154(b) by 0 days.

(21) Appl. No.: 11/654,119

(22) Filed: Jan. 17, 2007

(65) Prior Publication Data

US 2008/0169387 A1  Jul. 17, 2008

(51) Int. Cl.
*H01R 33/00* (2006.01)
(52) U.S. Cl. ........................................... 439/34
(58) Field of Classification Search .............. 439/34, 439/501, 502, 504, 342; 248/73, 74.2, 175, 248/71; 174/72 A, 68.1; 361/827, 826
See application file for complete search history.

(56) References Cited

U.S. PATENT DOCUMENTS 4,213,589 A * 7/1980 Pierron et al. ............. 248/74.1
6,282,969 B1 * 9/2001 Daniel ........................ 73/866.1
6,953,175 B1 * 10/2005 Carrera ....................... 248/74.1
2005/0230581 A1 * 10/2005 Gau .......................... 248/229.1

FOREIGN PATENT DOCUMENTS

JP        10-070813        * 3/1998

* cited by examiner

*Primary Examiner*—Alexander Gilman
(74) *Attorney, Agent, or Firm*—Osha•Liang LLP

(57) ABSTRACT

A retainer harness clip apparatus for securing a wire harness to a bezel of a vehicle bumper includes a retainer member having a ring-shaped portion configured to fit around the bezel, a securing portion configured to secure the retainer to the bezel, and a first attachment part. The retainer harness clip apparatus further includes a harness clip member engageable with the retainer member and has a wire harness securing portion and a second attachment part. Upon engagement of the retainer member and the harness clip member, the first attachment part and the second attachment part mutually engage.

13 Claims, 7 Drawing Sheets

RETAINER HARNESS CLIP APPARATUS

BACKGROUND OF INVENTION

1. Field of the Invention

The invention generally relates to a retainer and clip for a bezel in a vehicular bumper, and more particular relates to a retainer and clip for a bezel in a vehicular bumper capable of securing a bumper wire harness to a bezel.

2. Background Art

A vehicular bumper typically contains a wire harness, which is necessary to electrically connect components of the bumper to the vehicle main body. The wire harness may contain wires for numerous different applications, including impact sensors and distance sensors. Such sensors are often added to an existing vehicle after market, or incorporated when manufacturing the vehicle. In either case, the sensors are attached to the bumper and the wires from the sensors are integrated into the wire harness.

SUMMARY OF INVENTION

In general, in one aspect, the invention relates to a method for a retainer harness clip apparatus for securing a wire harness to a vehicle bumper. In one or more embodiments, the retainer harness clip apparatus secures a wire harness to a bezel of a vehicle bumper.

In one or more embodiments of the present invention, a retainer harness clip apparatus comprises a retainer member comprising a ring-shaped portion configured to fit around a bezel, a securing portion configured to secure the retainer to the bezel, and a first attachment part; and a harness clip member engageable with the retainer member and comprising a wire harness securing portion and a second attachment part. Upon engagement of the retainer member and the harness clip member the first attachment part and the second attachment part mutually engage.

In one or more embodiments of the present invention, a retainer harness clip apparatus comprises a retainer member configured to fit around a bezel, and a harness clip member engageable with the retainer member. The retainer member comprises a securing means configured to secure the retainer to the bezel, and a first attachment means. The harness clip member comprises a wire harness securing means and a second attachment means. Upon engagement of the retainer member and the harness clip member, the first attachment means and the second attachment means mutually engage.

Other aspects and advantages of the invention will be apparent from the following description and the appended claims.

DETAILED DESCRIPTION

Exemplary embodiments of the invention will be described with reference to the accompanying figures. Like items in the figures are shown with the same reference numbers.

In one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the invention relate to a retainer and clip for attaching a vehicle bumper wire harness to the vehicle bumper. More specifically, one or more embodiments of the invention relate to a retainer and clip for attaching a vehicle bumper wire harness to a bezel disposed in the vehicle bumper such that the wire harness is secured to the bezel.

Figure 1:
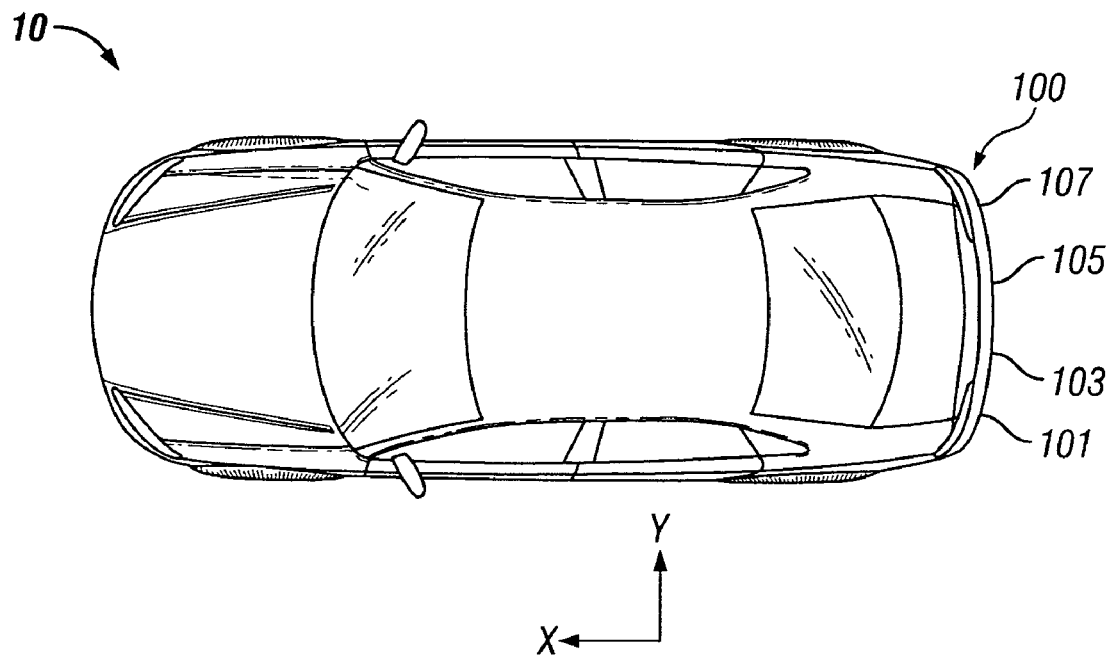
FIG. 1 shows a top view of a vehicle having distance sensor assemblies according to one or more embodiments of the present invention.
Figure 2:
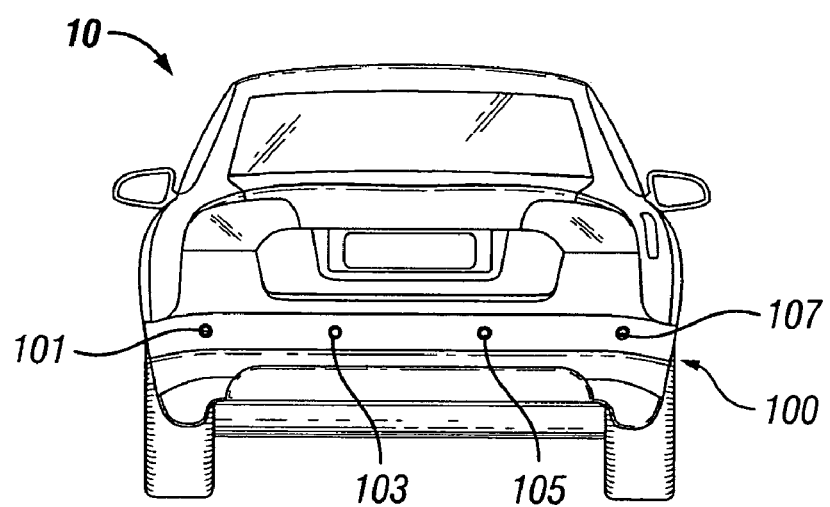
FIG. 2 shows a rear perspective view of a vehicle having distance sensor assemblies according to one or more embodiments of the present invention.

FIGS. 1 and 2 show a vehicle 10 having a rear bumper 100. The rear bumper 100 has distance sensor assemblies 101, 103, 105, 107 disposed thereon. One of ordinary skill in the art will recognize that the location and number of distance sensor assemblies 101, 103, 105, 107 of the embodiments shown in FIGS. 1 and 2 are only examples, and can vary depending on the application.

Figure 3:
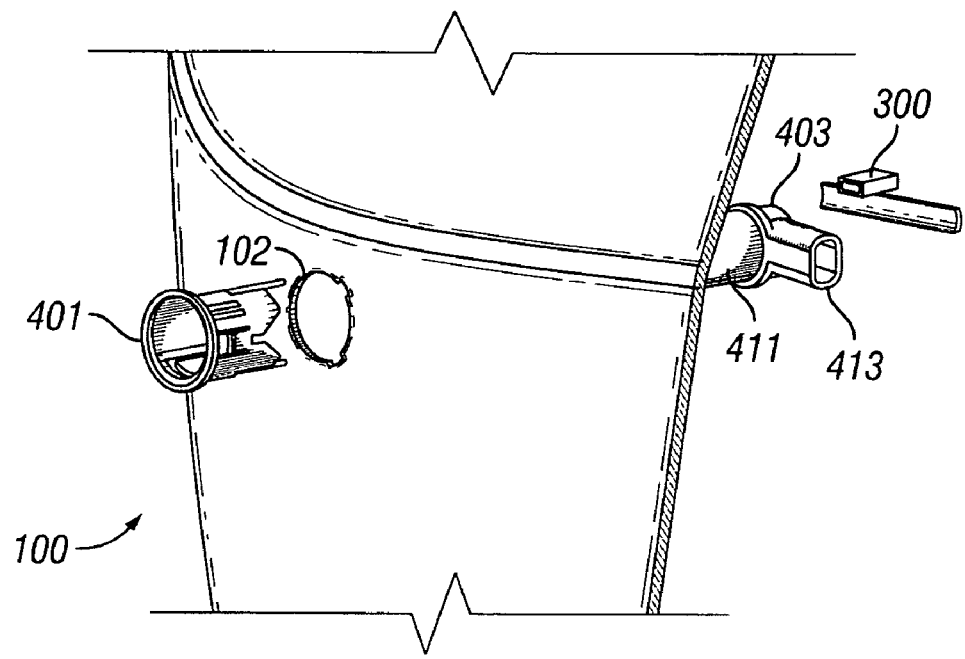
FIG. 3 shows an exploded view of a distance sensor assembly according to one or more embodiments of the present invention.
Figure 4:
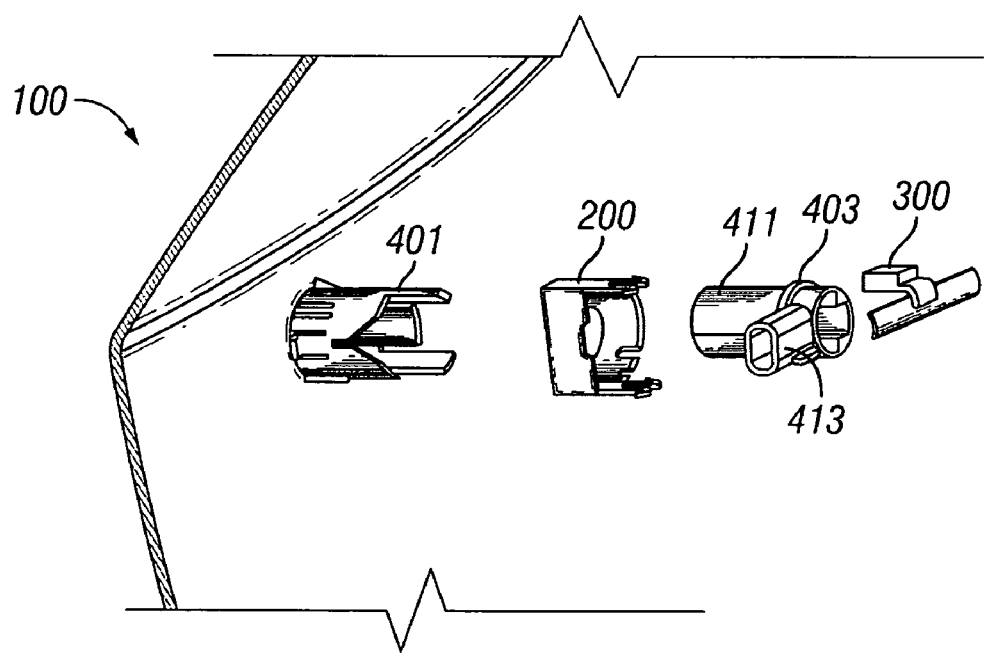
FIG. 4 shows an exploded view of a distance sensor assembly according to one or more embodiments of the present invention.

FIGS. 3 and 4 show an exploded view of a distance sensor assembly 101 according to one or more embodiments of the present invention.

As shown in FIG. 3, the bumper 100 has an opening 102 therein. The opening 102 could be drilled or cut from the bumper, or the bumper could be formed with the opening 102 therein. The distance sensor assembly 101 has a bezel 401, retainer 200, wire harness clip 300, distance sensor 403, sensor wire 501, and sensor plug 405. The bezel 401, which is in the shape of a hollow cylinder in this embodiment, is disposed within the opening 102. Once the bezel 401 is secured within the opening 102, the retainer 200 is disposed around the bezel 401, in the orientation shown in FIGS. 3 and 4. The retainer 200 will be described in greater detail below. A coaxial cylindrical end 411 of distance sensor 403 is plugged into the bezel 401, in the orientation shown in FIGS. 3 and 4. The harness clip 300 is then attached to a the retainer 200. The harness clip 300, and the way by which it attaches to the retainer 200, will be explained in detail below.

Figure 5:
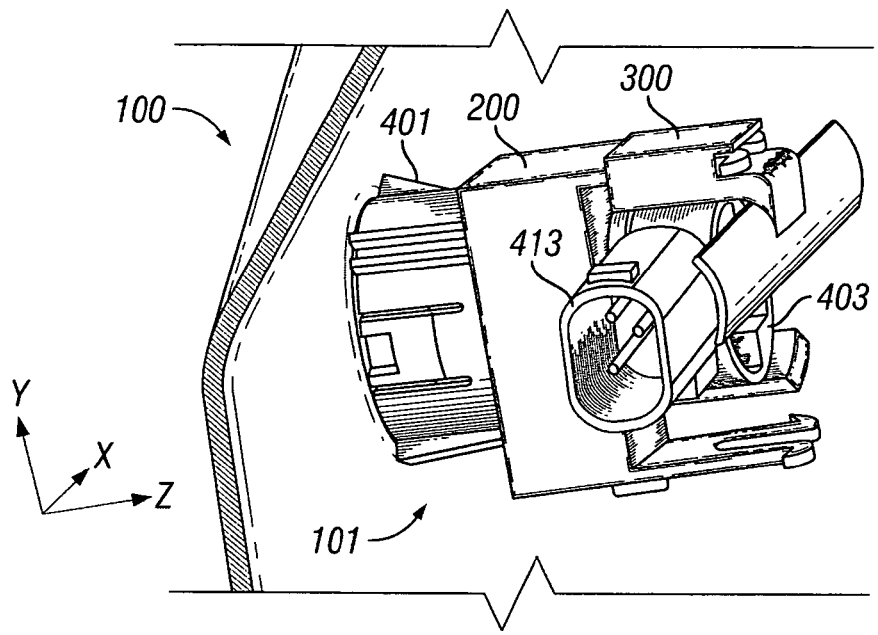
FIG. 5 shows an assembled distance sensor assembly in accordance with one or more embodiments of the present invention.
Figure 6:
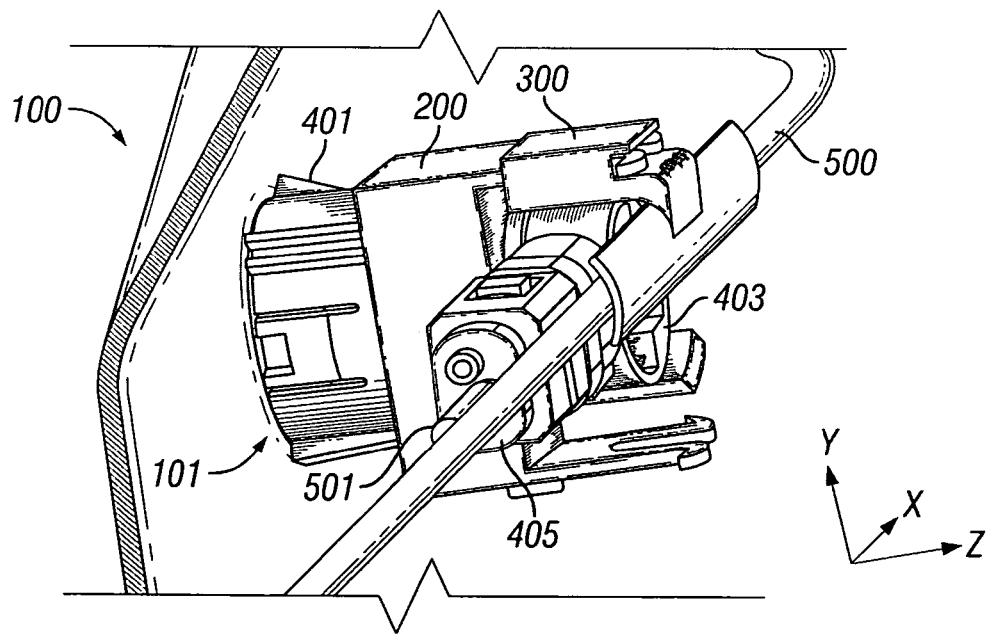
FIG. 6 shows an assembled distance sensor assembly with a wire harness attached in accordance with one or more embodiments of the present invention.
Figure 7:
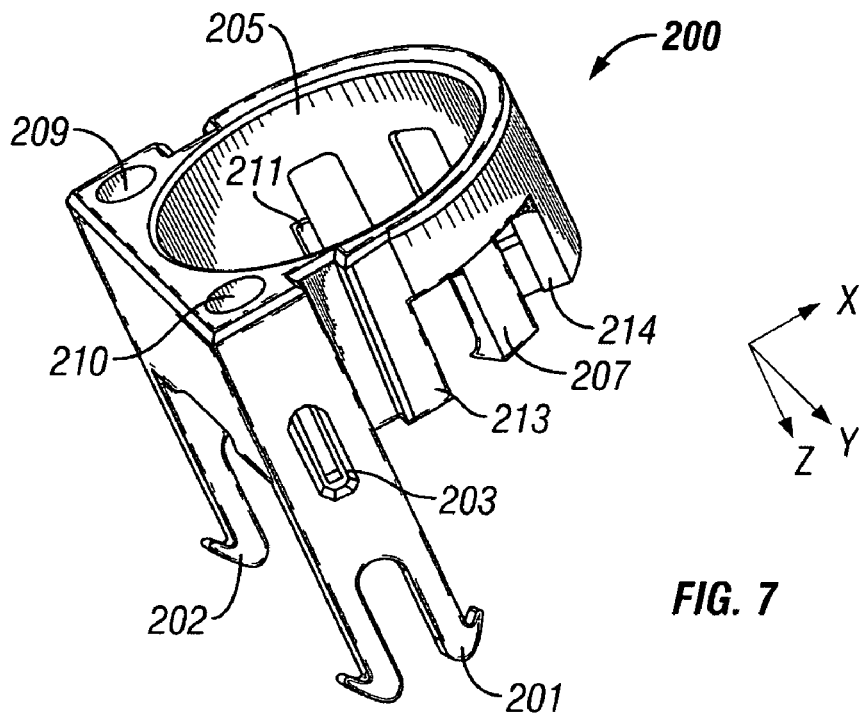
FIG. 7 shows a perspective view of a retainer according to one or more embodiments of the present invention.
Figure 8:
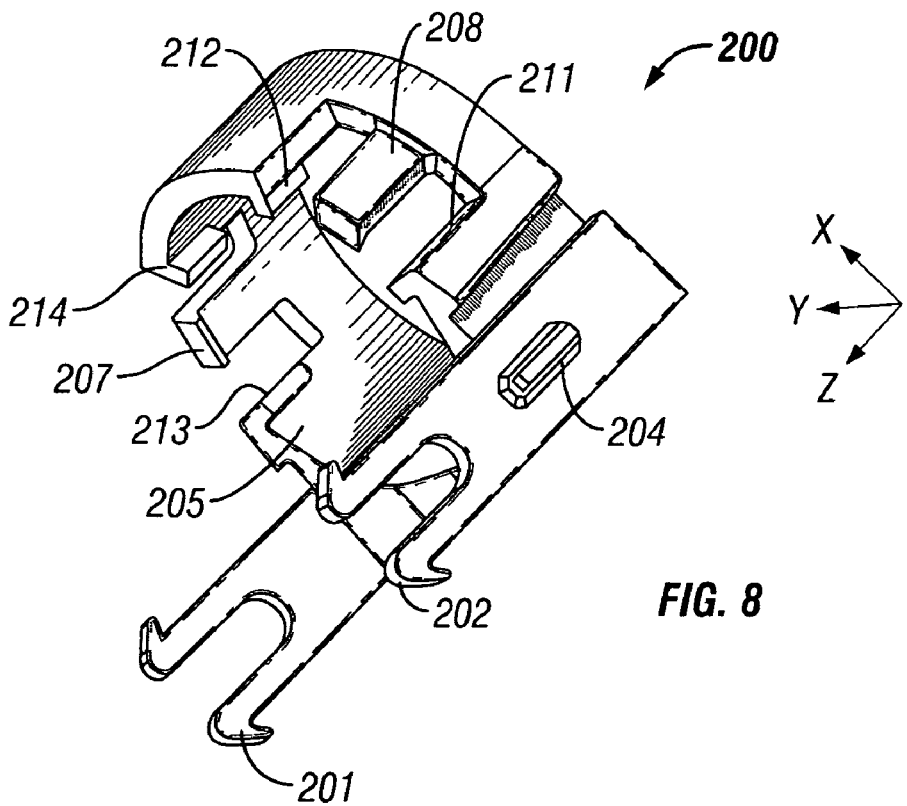
FIG. 8 shows a perspective view of a retainer according to one or more embodiments of the present invention.
Figure 9:
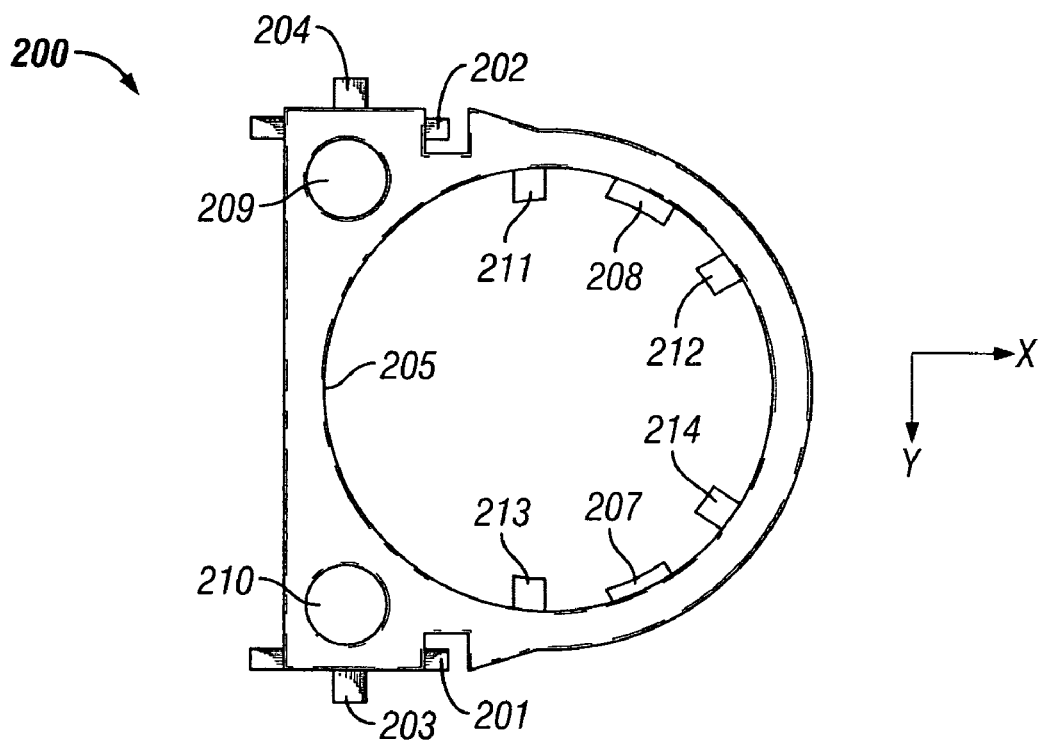
FIG. 9 shows a view of a retainer in the x-y plane according to one or more embodiments of the present invention.
Figure 10:
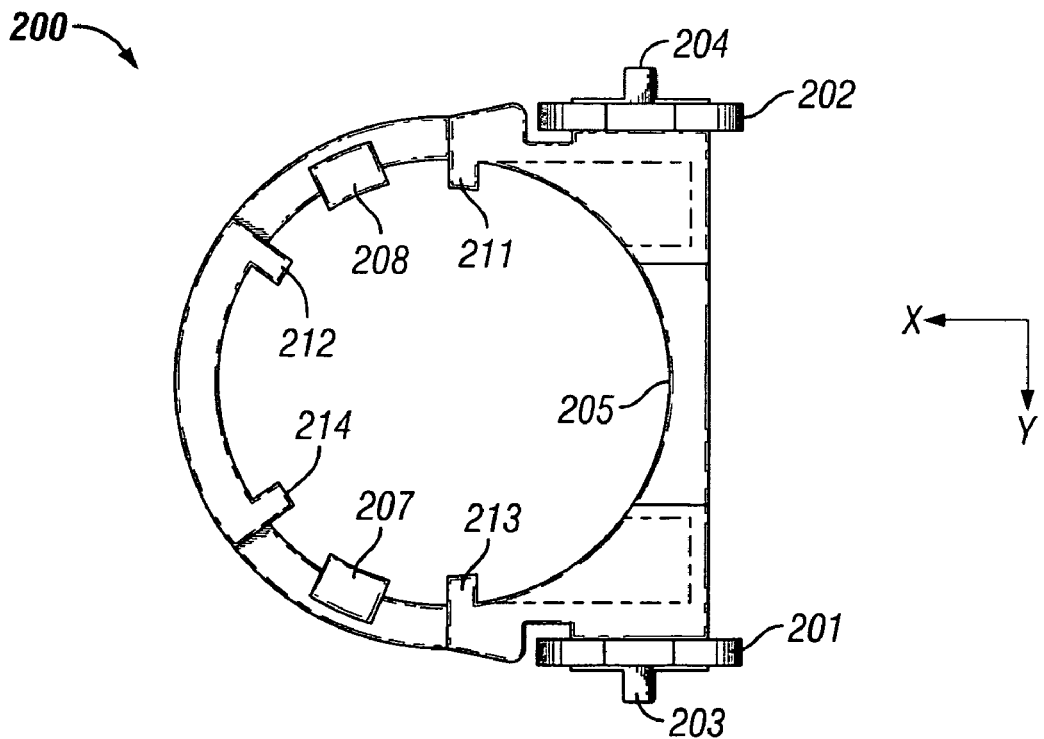
FIG. 10 shows a view of a retainer in the x-y plane according to one or more embodiments of the present invention.
Figure 11:
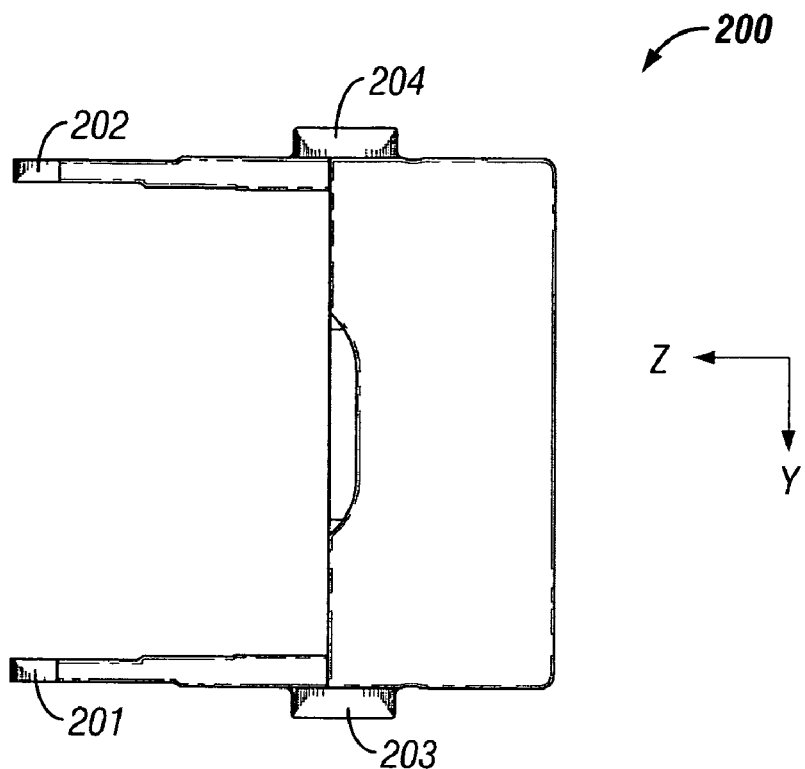
FIG. 11 shows a view of a retainer in the y-z plane according to one or more embodiments of the present invention.
Figure 12:
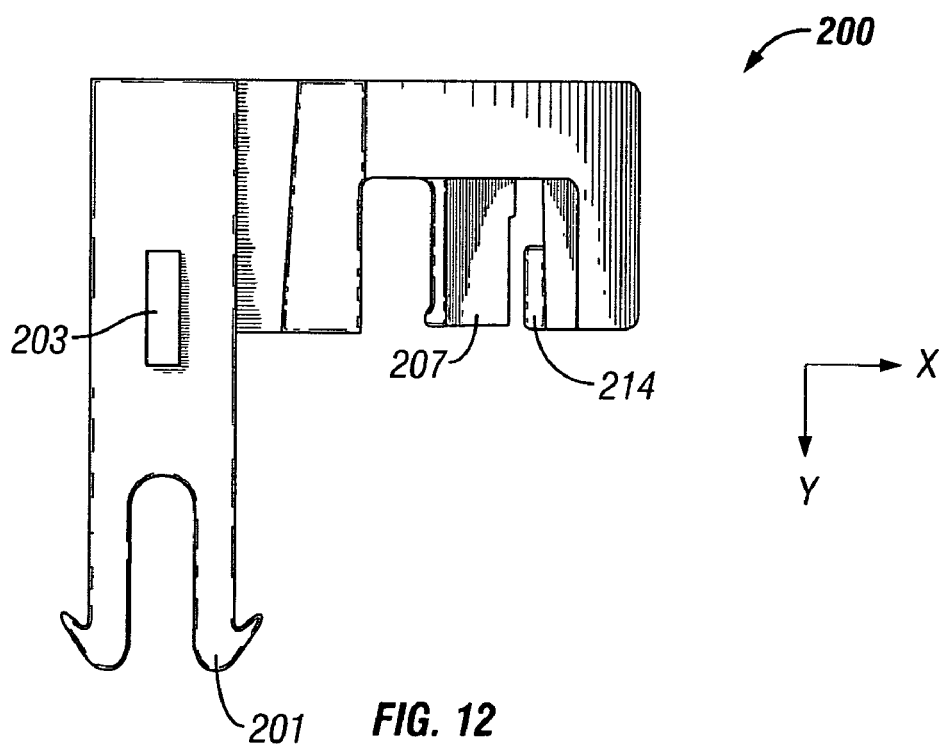
FIG. 12 shows a view of a retainer in the x-z plane according to one or more embodiments of the present invention.

FIG. 5 shows an assembled distance sensor assembly 101 in accordance with one or more embodiments of the invention. FIG. 6 shows the assembled distance sensor assembly 101 shown in FIG. 5 with a wire harness 500 attached. The sensor plug 405, which is disposed at a first end of the sensor wire 501, is plugged into a semi-cylindrical end 413 of the distance sensor 403, the semi-cylindrical end 413 being normal to the axis of the bezel 401. In FIGS. 5 and 6, the axis of the bezel is the z-axis, while the axis of the semi-cylindrical end 413 is the x-axis. A second end of the sensor wire 501 is attached to the wire harness 500. The wire harness 500 is secured to the distance sensor assembly 101 by the inner surface of a curved plate 301 of the harness clip 300, as shown in FIG. 6.

The retainer 200 will now be described in detail with reference to FIGS. 7-12. FIGS. 7-12 show various views of the retainer 200 according one embodiment of the present invention. The retainer 200 has a ring-shaped portion 205, which is configured to fit around the bezel 401. The retainer also has guiding protrusions 211, 212, 213, 214 on the inner surface of the ring shaped portion 205. The guiding protrusions 211, 212, 213, 214 correspond to co-axial grooves on the bezel 401. The guiding protrusions 211, 212, 213, 214 guide the retainer 200 axially along the z-axis onto the bezel 401 and prevent rotational movement of the retainer 200 about the z-axis with respect to the bezel 401. The retainer 200 further includes deformable securing latches 207, 208. The deformable securing latches 207, 208 have smaller thicknesses than the ring shaped portion 205. The ends of the deformable securing latches 207, 208 curve towards the center of the ring shaped portion 205. The securing latches 207, 208 secure the retainer 200 into place, once the retainer 200 is at the desired position around the bezel 401, by hooking the curved ends onto grooves on the bezel 501. The retainer 200 also includes a pair of deformable attachment prongs 201, 202 and stoppers 203, 204. The deformable attachment prongs 201, 202 have hook-shaped ends which curve outwards. The function of the attachment prongs 201, 202 and stoppers 203, 204 will be discussed below in conjunction with the harness clip 300. The retainer 200 also may include cylindrical cutout portions 209, 210 to save material during manufacturing.

Figure 13:
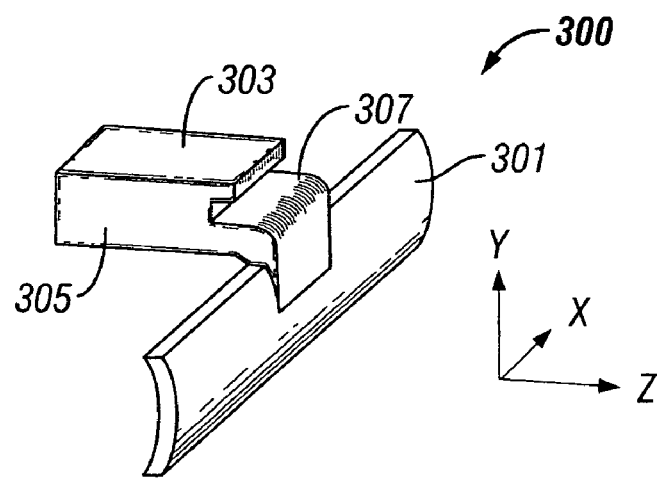
FIG. 13 shows a perspective view of the harness clip according to one embodiment of the present invention.
Figure 14:
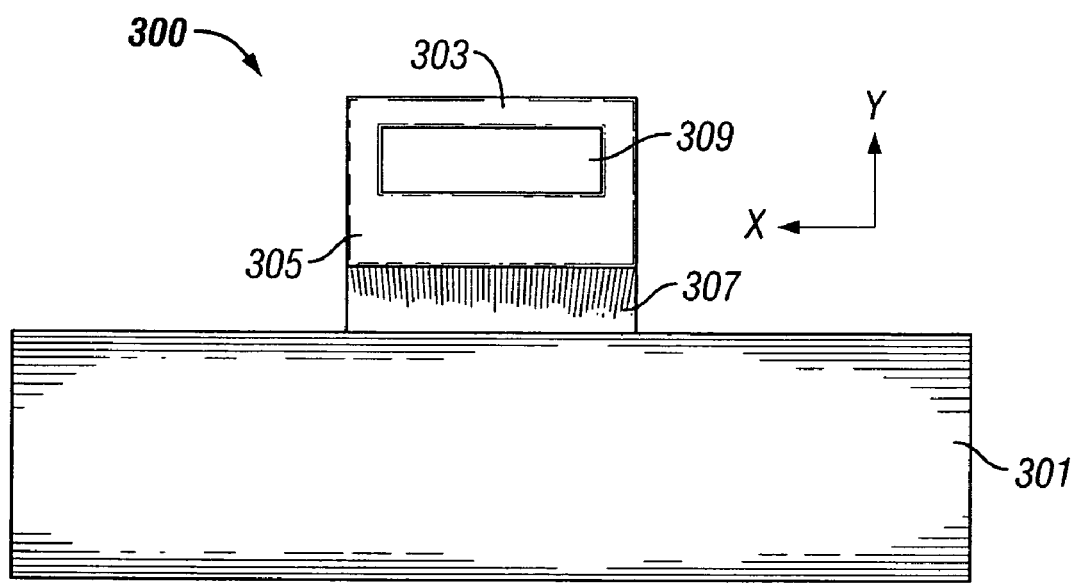
FIG. 14 shows a view of the harness clip in the x-y plane according to one embodiment of the present invention.

The harness clip 300 will now be described in detail with reference to FIGS. 13 and 14. FIGS. 13 and 14 show a perspective and x-y view respectively of the harness clip 300 according to one embodiment of the present invention. The harness clip 300 includes a block shaped main body 302 with a rectangular opening 309 therein. The rectangular opening 309 divides the main body 301 into an upper portion 303 and a lower portion 305. One pair of the attachment prongs 201, 202 of the retainer 200 is inserted into the opening 309, such that the attachment prongs 201, 202 bend inwards until completely inserted, at which point the hook-shaped ends of the attachment prongs 201, 202 latch onto the harness clip 300. The stoppers 203, 204 stop movement of the harness clip 300 once inserted, such that the harness clip is effectively secured between the ends of the attachment prongs 201, 202 and the stoppers 203, 204. The upper portion 303 has a smaller thickness than the lower portion 305. One end of the lower portion 305 extends past the upper portion 303 and is bent into a curved portion 307. A rectangular curved plate 301 is attached to the curved portion 307. The wire harness 500 is secured by the inner surface of the curved plate 301.

One or more embodiments of the present invention may include one or more of the following advantages. When installing sensors and/or bezels, a bumper supplier can attach a wire harness to a bumper without having to make any changes to the design of the bumper. The retainer harness clip apparatus of one or more embodiments allows a wire harness to be secured to bezels in order to properly route the wire harness. In one or more embodiments, a retainer harness clip apparatus is provided that allows easy assembly and disassembly and allows a single, simple apparatus to be used in different locations on the bumper. One or more embodiments allow multiple wire harnesses to be attached to a bumper by having multiple attachment prongs on the retainer.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A retainer harness clip apparatus for securing a wire harness to a bezel of a vehicle bumper, comprising:
    a retainer member comprising a ring-shaped portion configured to fit around the bezel, a securing portion configured to secure the retainer to the bezel, and a first attachment part; and
    a harness clip member engageable with the retainer member and comprising a curved plate and a second attachment part,
    wherein upon engagement of the retainer member and the harness clip member, the first attachment part and the second attachment part mutually engage, and
    wherein a longitudinal axis of the curved plate is perpendicular to an axis of the bezel.

2. The retainer harness clip apparatus of claim 1, wherein the first attachment part comprises deformable prongs, and the second attachment part comprises an aperture into which the deformable prongs are inserted.

3. The retainer harness clip apparatus of claim 2, wherein the ends of the deformable prongs are hook-shaped, such that the hook-shaped ends secure the harness clip member to the retainer member when the deformable prongs are inserted into the aperture.

4. The retainer harness clip apparatus of claim 3, wherein the retainer member has a stopper which stops the harness clip member when the deformable prongs are inserted into the aperture, such that the harness clip member is secured between the hook-shaped ends and the stopper.

5. The retainer harness clip apparatus of claim 1, wherein the securing portion comprises two deformable protrusions having ends curved towards the center of the ring-shaped portion which is configured to secure the retainer member to the bezel.

6. The retainer harness clip apparatus of claim 1, wherein the retainer member further comprises a guiding portion on an inner surface of the ring-shaped portion of the retainer member configured to guide the retainer member onto the bezel, and configured to prevent rotational movement of the retainer member on the bezel.

7. The retainer harness clip apparatus of claim 1, wherein an inner surface of the curved plate is configured to secure the wire harness.

8. The retainer harness clip apparatus of claim 1, wherein the retainer member has a plurality of cylindrical cut-out portions.

9. The retainer harness clip apparatus of claim 1, wherein the retainer member further comprises a third attachment part, and a second clip member engageable with the retainer member and comprising a wire harness securing portion and a fourth attachment part, wherein upon engagement of the retainer member and the harness clip member the third attachment part and the fourth attachment part mutually engage.

10. A retainer harness clip apparatus for securing a wire harness to a bezel of a vehicle bumper, comprising:

a retainer member comprising a ring-shaped portion configured to fit around the bezel, a securing portion comprising two deformable protrusions having ends curved towards the center of the ring-shaped portion which is configured to secure the retainer member to the bezel, and a first attachment part; and a harness clip member engageable with the retainer member and comprising a wire harness securing portion and a second attachment part, wherein upon engagement of the retainer member and the harness clip member, the first attachment part and the second attachment part mutually engage, and wherein the two deformable protrusions have a smaller thickness than the ring shaped portion.

11. The retainer harness clip apparatus of claim 10, wherein the retainer member further comprises a guiding portion on an inner surface of the ring-shaped portion of the retainer member configured to guide the retainer member onto the bezel, and configured to prevent rotational movement of the retainer member on the bezel.

12. The retainer harness clip apparatus of claim 10, wherein the retainer member has a plurality of cylindrical cut-out portions.

13. A retainer harness clip apparatus for securing a wire harness to a bezel of a vehicle bumper, comprising:

a retainer member configured to fit around the bezel, comprising a securing means configured to secure the retainer to the bezel, and a first attachment means; and a harness clip member engageable with the retainer member and comprising a curved plate and a second attachment means, wherein upon engagement of the retainer member and the harness clip member, the first attachment means and the second attachment means mutually engage, and wherein a longitudinal axis of the curved plate is perpendicular to an axis of the bezel.

\* \* \* \* \*